US006466231B1

(12) United States Patent
Dow et al.

(10) Patent No.: US 6,466,231 B1
(45) Date of Patent: Oct. 15, 2002

(54) APPLIANCE AND METHOD OF USING SAME FOR CAPTURING IMAGES

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,573

(22) Filed: Aug. 7, 1998

(51) Int. Cl.[7] ................................................ G06T 15/00
(52) U.S. Cl. ..................................................... 345/629
(58) Field of Search ................................ 345/419, 473, 345/474, 475, 629, 635, 636

(56) References Cited

U.S. PATENT DOCUMENTS

| 5,550,938 A | * | 8/1996 | Hayakawa et al. ......... 382/313 |
| 5,611,033 A | | 3/1997 | Pitteloud et al. ............ 395/135 |
| 5,977,978 A | * | 11/1999 | Carey et al. ................ 345/419 |

FOREIGN PATENT DOCUMENTS

| EP | 0486160 A | 5/1992 |
| EP | 0795795 A | 9/1997 |
| EP | 0902582 A | 3/1999 |
| GB | 2288512 A | 10/1995 |
| JP | 08051526 | 2/1996 |

* cited by examiner

Primary Examiner—Phu K. Nguyen (57) ABSTRACT

A hand-held image capture and communication appliance and method of using same are provided wherein images may be acquired via scanning means and saved in an internal memory. The scanning appliance includes a processor for manipulating and exhibiting the images on a built-in display screen. Program code stored in the internal memory and executed by the processor includes a capture page module for processing the image data acquired through the scanning means by filtering and discarding redundant image data to form a whole image. The capture page module includes a code segment for displaying a first animation that is designed as a metaphor to signify the progression of the image data processing taking place in the appliance. The metaphor used in the preferred embodiment is a bar graph overlaying a thumbnail of the capture path followed in acquiring the image. The capture page module includes a code segment for displaying a second animation in which the most recently captured image is shown as an outline displacing a previously captured image from the display. This animation communicates to the user the logical sequencing of the captured images as the new last image in the sequence displaces the previous last image in the sequence. Moreover, the display of the newly captured page or image allows the user to examine the page in detail to verify whether the correct scan path was followed and whether any desired content is missing from the image. Should an error occur during the scanning process, the capture page module invokes an error utility module to display a textual dialog explaining the nature of the error.

16 Claims, 10 Drawing Sheets

APPLIANCE AND METHOD OF USING SAME FOR CAPTURING IMAGES

CROSS REFERENCE TO RELATED APPLICATIONS

This application is related to U.S. application entitled "APPLIANCE AND METHOD OF USING SAME HAVING A SEND CAPABILITY FOR STORED DATA" U.S. application Ser. No. 09/130,869, U.S. application entitled "APPLIANCE AND METHOD OF USING SAME HAVING A USER HELP CAPABILITY" U.S. application Ser. No. 09/130080, U.S. application entitled "APPLIANCE AND METHOD OF USING SAME HAVING A DELETE CAPABILITY FOR SAVED DATA" U.S. application Ser. No. 09/130082, U.S. application entitled "APPLIANCE AND METHOD OF USING SAME HAVING A CAPABILITY TO GRAPHICALLY ASSOCIATE AND DISASSOCIATE DATA WITH AND FROM ONE ANOTHER" U.S. application Ser. No. 09/130,789, U.S. application entitled "APPLLINCE AND METHOD FOR COMMUNICATING AND VIEWING MULTIPLE CAPTURED IMAGES" U.S. application Ser. No. 09/130,081, U.S. application entitled "APPLIANCE AND METHOD FOR NAVIGATING AMONG MULTIPLE CAPTURED IMAGES AND FUNCTIONAL MENUS" U.S. application Ser. No. 09/130,584, U.S. application entitled "APPLIANCE AND METHOD FOR CAPTURING IMAGES HAVING A USER ERROR INTERFACE" U.S. application Ser. No. 09/130,572, U.S. application entitled "APPLIANCE AND METHOD FOR VIEWING CAPTURED IMAGES" U.S. application Ser. No. 09/131,258, and U.S. application entitled "APPLIANCE AND METHOD FOR MENU NAVIGATION" U.S. application Ser. No. 09/130,868, which are filed contemporaneously herewith and are incorporated herein by reference.

BACKGROUND OF THE INVENTION

The present invention relates generally to the field of capturing information (e.g., text, graphics, photos, etc.) for storage in a digital format and, more particularly, to a portable hand-held appliance for capturing images through digital scanning that has a graphical user interface for displaying the captured images for user manipulation and processing, and communicating those images to another device or appliance.

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded.

Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them-effectively and distribute them in a timely fashion. Users can share and distribute information easily by scanning directly to their email or personal computer (PC) fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, what is sought is a portable, hand-held image capturing device that allows users to process or manipulate captured images in the device and the ability to communicate the images directly to some other unit such as a computer, printer, or facsimile machine. In addition, the image capturing device should provide cordless operation and use a standard interface for transferring images to other devices. A GUI is preferred to assist users, particularly novices, in operating the device.

SUMMARY OF THE INVENTION

Certain novel features and advantages of the invention will be set forth in the description that follows and will become apparent to those skilled in the art upon examination of the following or may be learned with the practice of the invention.

To achieve the novel features and advantages, the present invention is generally directed to a portable hand-held image capture and communication appliance and method of using same by which images may be captured via capturing means and saved in an internal memory. The appliance includes a processor for manipulating and exhibiting the images on a built-in display screen. Program code stored in the internal memory and executed by the processor includes a capture page module for processing the image data acquired through the scanning means by filtering and discarding redundant image data to form a whole image.

According to an aspect of the invention, the capture page module includes a code segment for displaying a first animation. In the preferred embodiment, the first animation is designed as a metaphor to signify the progression of the image data processing taking place in the appliance. The metaphor used in the preferred embodiment is a bar graph in which the bar fills a space in proportion to the progress made in completing the image data processing.

According to another aspect of the invention, the capture page module includes a code segment for displaying a second animation in which the most recently captured image is shown displacing a previously captured image from the display. Advantageously, this animation communicates to the user the logical sequencing of the captured images as the new last image in the sequence displaces the previous last image in the sequence. Moreover, the display of the newly captured page or image allows the user to examine the page in detail to verify whether the correct scan path was followed and whether any desired content is missing from the image.

Should an error occur during the scanning process, the capture page module invokes an error utility module to display a textual dialog explaining the nature of the error.

The appliance according to the present invention has many advantages, a few of which are highlighted hereafter, as examples.

One advantage of the invention is that intelligent image processing features, normally reserved for a traditional computer, are provided in a portable, hand-held image capturing appliance.

Another advantage of the invention is that images or pages can be acquired using a simple and easy to learn scan technique.

Still another advantage of the invention is that animation is used during post capture processing to communicate to the user the results of the scan, including whether an errant scan path was followed and/or image content was missed during the scan.

Yet another advantage of the invention is that a GUI is provided, which allows new users to operate the appliance with minimal training or assistance.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Architecture of the Image Capture and Communication Appliance

Figure 1A:
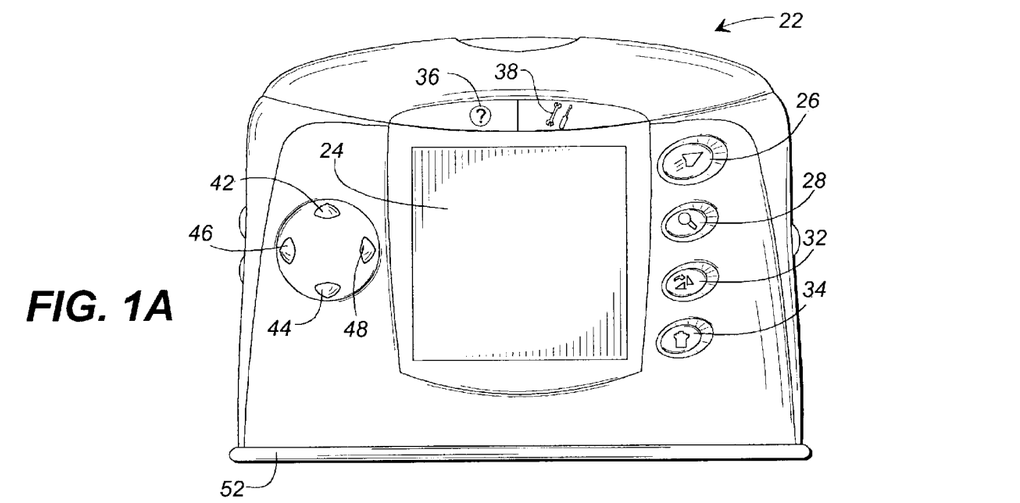
FIG. 1A is an elevation view of the hand-held image capture and communication appliance according to the present invention, which depicts a side of the unit containing the display screen, operation buttons, and navigation buttons.

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22.

Common types of flat-panel displays suitable for use in the present invention include electroluminescent displays, gas plasma discharge displays, and liquid crystal displays (LCDs). Display 24 is the means by which information, including captured images, text, icons, and animations, is communicated to the user. As used herein, the term "image" encompasses both text (binary) and color, graphic, or grayscale visuals. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been captured into memory through photoelement array 52. Note that an image captured in memory is interchangeably referred to herein as a "page" because the image is portrayed in appliance 22 as a physical page of text and/or imagery. Activation of tools button 38 presents the user with a menu that includes possible image operations (e.g., image attachment/grouping, image detachment/ungrouping), changing the mode of appliance 22 (i.e., toggling between text (binary) capture and color, graphic, or grayscale capture modes), calibrating appliance 22, displaying a screen identifying important specifications such as a model number, hardware or software release number, memory equipage, etc., or other user utilities not deserving of a dedicated external button for activation. Help button 36 provides the user with access to general tutorials, process animations, how-to instructions on the operation of appliance 22, and context sensitive instruction when help is requested while another operation or menu is active. The navigation buttons include an up button 42, a down button 44, a left button 46, and a right button 48 and are controlled by the user to steer a course through menu items and to view images or pages that have been captured in memory.

Figure 1B:
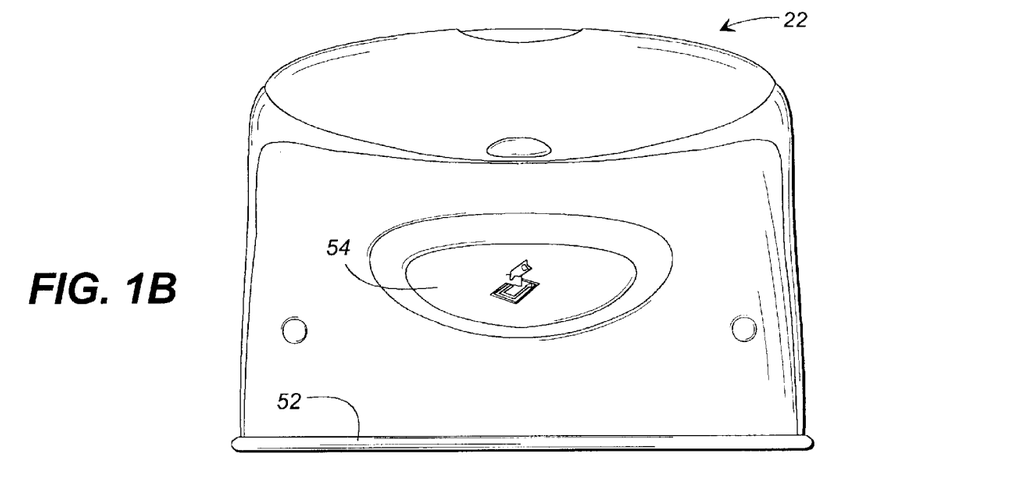
FIG. 1B is an elevation view of the appliance of FIG. 1A depicting the opposing side to that illustrated in FIG. 1A, which contains the capture button for performing an image capture.
Figure 1C:
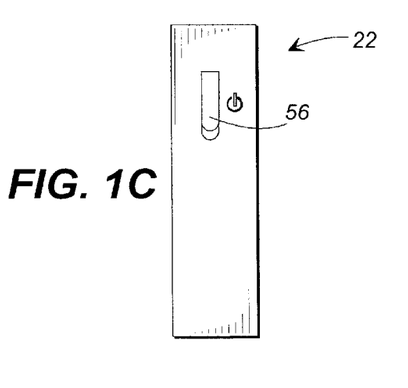
FIG. 1C is an elevation view of the appliance of FIGS. 1A and 1B depicting an end of the unit, which contains the power switch.
Figure 1D:
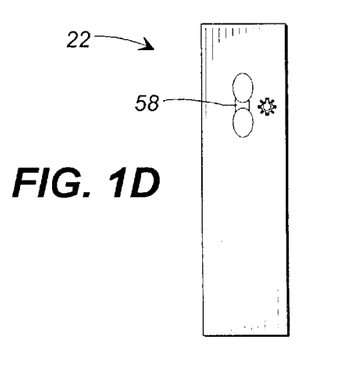
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to capture an image through photoelement array 52 and is released once the image is captured. A power switch 56 is included at one end of appliance 22 as shown in FIG. 1C and a brightness control 58 for display 24 is located at the other end of appliance 22 as shown in FIG. 1D. The positioning of the various buttons, power switch 56, and brightness control 58 on appliance 22 as shown in FIGS. 1A through 1D is merely exemplary and can be modified as needed to satisfy the ergonomic requirements of the targeted user community.

Figure 2:
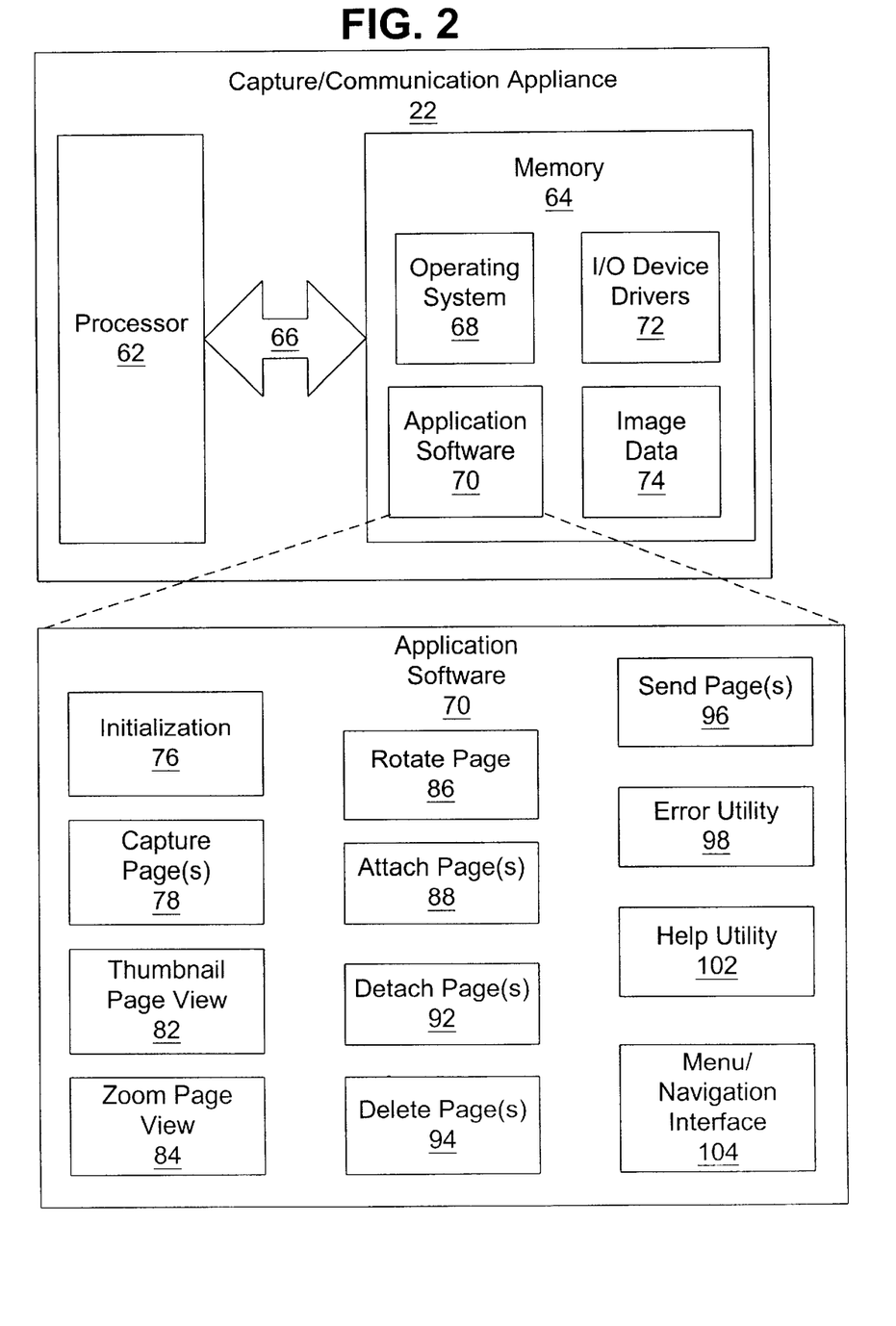
FIG. 2 is a high-level block diagram of the internal hardware and software architecture of the appliance illustrated in FIGS. 1A–1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each capture. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., 3260 Jay Street, Santa Clara, Calif. 95054-3309, which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the CCITT standard, which is used in the preferred embodiment of the present invention; however, other public or proprietary standards can be used with equal success. For example, JPEG is a common standard used to encoded graphic or color images. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72. Assembly language is used to implement time-critical code segments.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. A brief overview of each of the aforementioned modules follows hereafter.

Figure 8A:
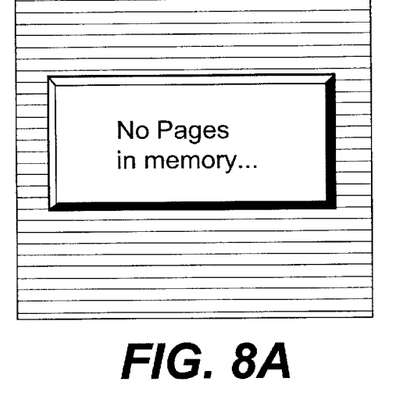
FIGS. 8A and 8B depict memory usage indicator icons on the display screen of FIG. 1A that provide a memory utilization report for the appliance.
Figure 8B:
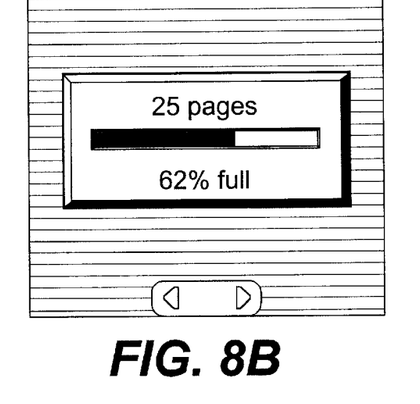
Figure 8C:
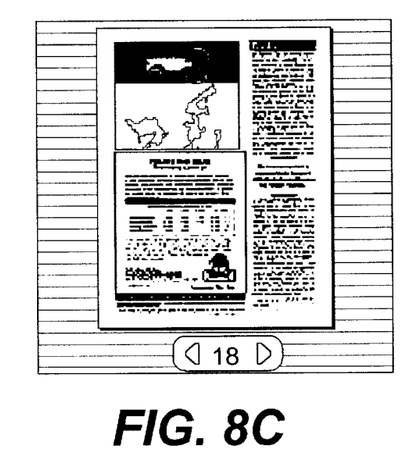
FIG. 8C illustrates a thumbnail view of a captured image on the display screen of FIG. 1A.
Figure 8D:
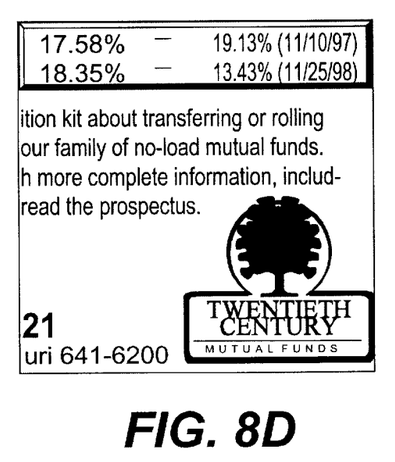
FIG. 8D illustrates a zoom view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. The operation of capture page module 78 will be discussed in detail hereinafter. Thumbnail view module 82 provides the default visual for pages and icons shown on display 24. For example, FIGS. 8A and 8B show a memory usage indicator icon for the cases where memory 64 is empty (i.e., no captured pages in memory) and where memory 64 holds 25 captured pages. In FIG. 8C, thumbnail view module 82presents an entire captured page on display 24. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be manipulated as an individual unit. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions through text and animation for operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
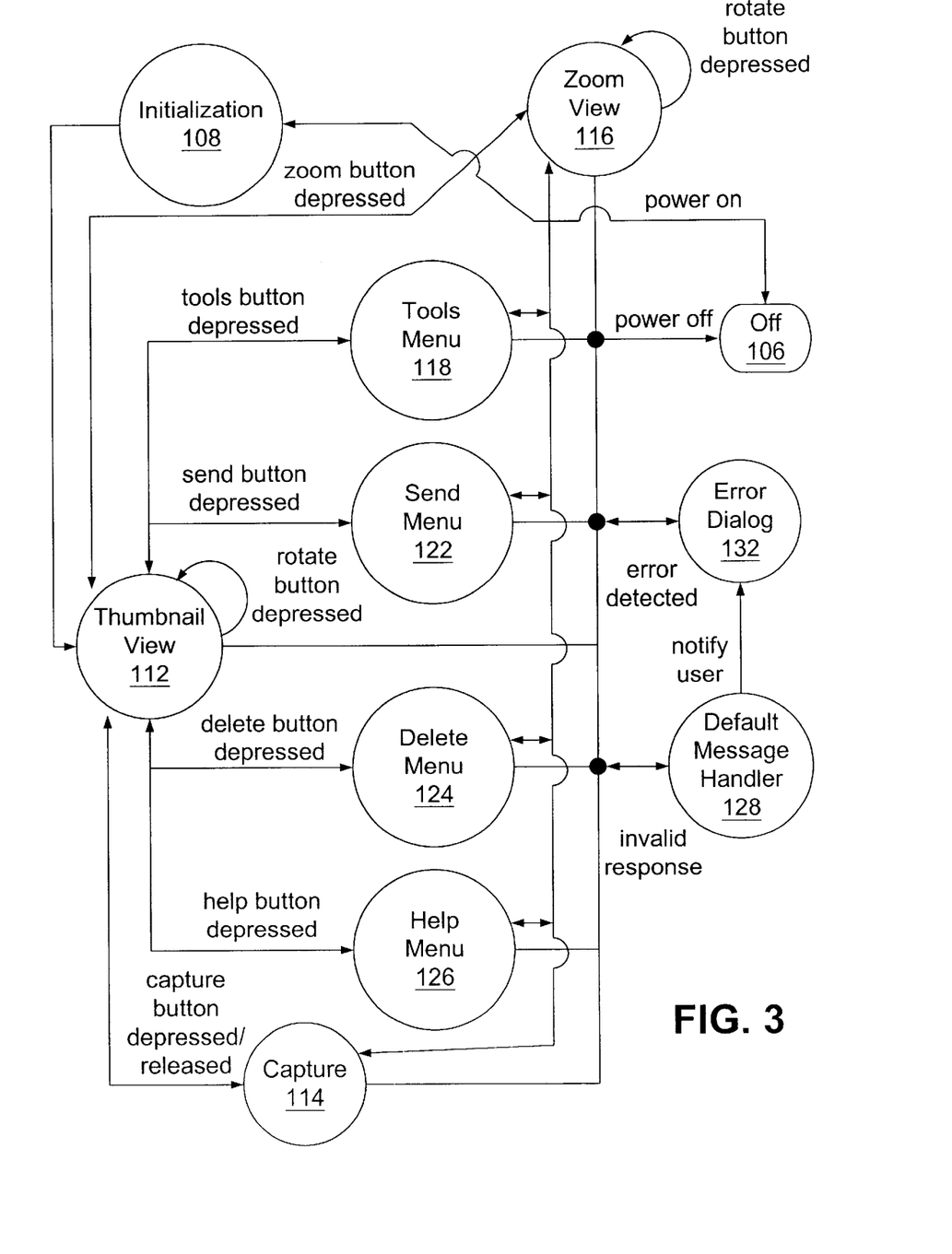
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28.

Figure 4A:
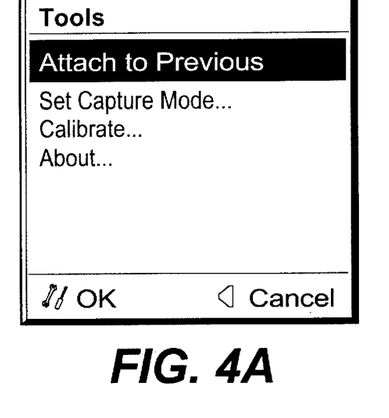
FIGS. 4A and 4B illustrate the tools menus displayed on the display screen of FIG. 1A.
Figure 4B:
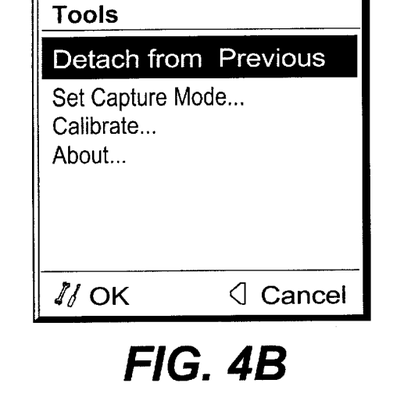
Figure 5:
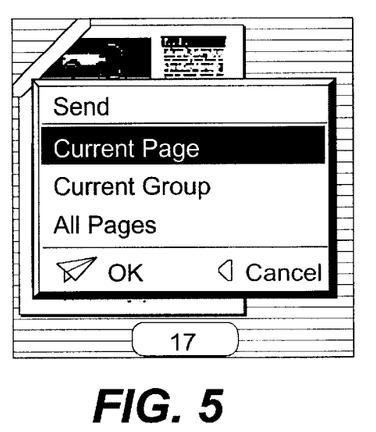
FIG. 5 illustrates the send menu displayed on the display screen of FIG. 1A.
Figure 6:
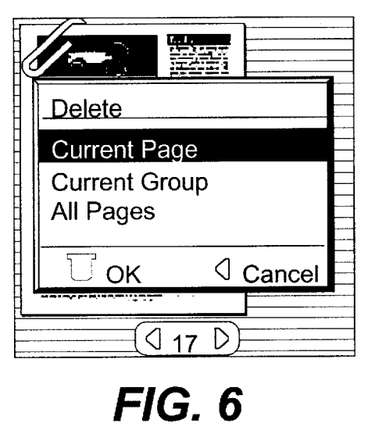
FIG. 6 illustrates the delete menu displayed on the display screen of FIG. 1A.
Figure 7:
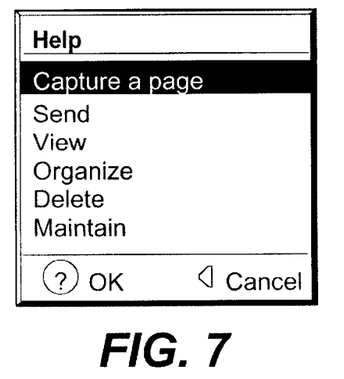
FIG. 7 illustrates the help menu displayed on the display screen of FIG. 1A.

From thumbnail view state 112 or zoom view state 116, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

An invalid response by the user (i.e., user presses an inactive button) will result in a transition to the default message handler state 128 where the user response is interpreted through the message that was generated internally. Frequently, the invalid response by the user will simply be ignored. Nevertheless, depending on the button that was invoked and the current state of application software 70, a transition is sometimes made to the error dialog state 132 to notify the user of their error via a message or graphic (e.g., a blinking icon) on display 24. Alternatively, error dialog state 132 can be entered directly if application software 70 detects an error in the execution of a valid operation. The most common example of this is when the user follows an improper capture path with appliance 22 during the image capture process.

The procedure of capturing an image or page with appliance 22 and the control exercised by capture page software module 78 will be described hereafter with frequent reference to (a) the flow charts of FIGS. 9A and 9B; (b) the animation scenes depicting proper and improper scan techniques of FIGS. 10A–10D, 11A–11B, and 12A–12B; the error screen of FIG. 14; and the image or page post-processing, verification, and rectangularization screens of FIGS. 13, 15, and 16.

Capturing a Page with the Appliance

A user initiates a page capture through activating image capture button 54 on the back of appliance 22. Thus, as represented by decision diamond 134 in FIG. 9A, the process begins with capture page module 78 (see FIG. 2) processing a message indicating that capture button 54 has been activated. Depending on the current state of application software 70, a page capture may not be a valid operation as indicated by decision diamond 136. If page capture button 54 is not currently active or live, the user's attempt to capture a page is ignored. In the preferred embodiment, unless the system is in the process of actively sending a page to another device, which is encompassed in send menu state 122 of FIG. 3, or communicating an error to the user, which is represented by error dialog state 132 of FIG. 3, application software 70 will abort the current task and begin a page capture. Note that even if the system is currently displaying the send menu, as shown in FIG. 5, to start a send operation, a page capture initiation will override this state unless data is currently being transferred between appliance 22 and another device. Thus, if page capture button 54 is active, the process continues by following termination A where, as discussed in the foregoing, the current operation is aborted in step 138.

Unless appliance 22 is currently being used to capture a new image, it is unnecessary to power photoelement array 52 (see FIG. 1A). Accordingly, it is necessary in step 142 to redirect power from display 24 to photoelement array 52 at the beginning of the image capture process. Step 144 represents the capture process performed by the user, which will continue until capture button 54 is released, which is determined at decision diamond 146 or photoelement array 52 detects that appliance 22 has been lifted off the page or another capture error has occurred (e.g., scan speed was too fast, out of memory, too much rotation in the scan path, etc.), as represented by decision diamond 147. Help utility module 102 provides an instructional animation that demonstrates both proper and improper techniques for executing an image scan. Scenes from this animation are provided in FIGS. 10A–10D, 11A–11B, and 12A–12B. Note that this animation does not run automatically as part of the image capture process. Instead, the animation is provided as part of the help feature accessed through help button 36.

Figure 10A:
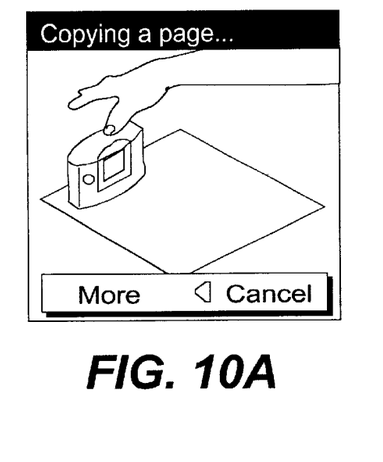
FIGS. 10A–10D depicts a proper scan path using the appliance of FIGS. 1A–1D.
Figure 10B:
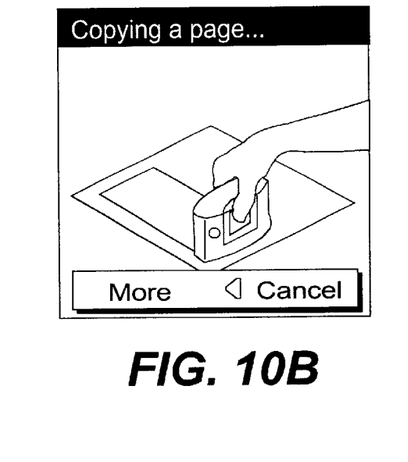
Figure 10C:
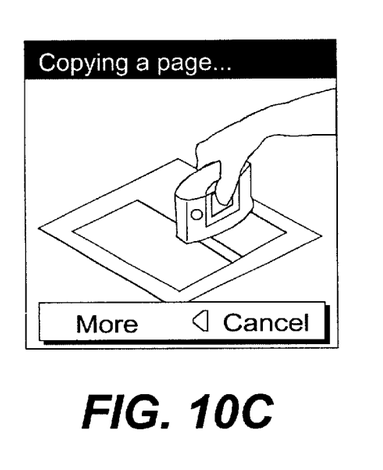
Figure 10D:
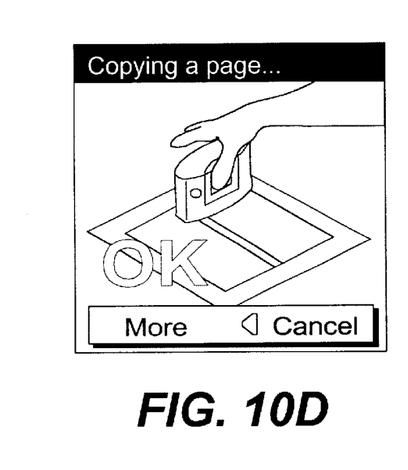

Turning first to FIGS. 10A–10D, the preferred scan path is illustrated in the collection of animation scenes shown therein. There are two requirements that must be followed to perform a successful scan: First, the user must maintain appliance 22 in engagement with the target image to be acquired. Second, the entire image must be traversed with photoelement array 52. As shown in FIG. 10A, the user activates capture button 54 while appliance 22 is in engagement with the target. In FIG. 10B, the user is shown to make a first stroke or pass with appliance 22 thereby acquiring the left side of the image. Next, appliance 22 is slid to the right where a second stroke or pass is made to acquire the right side of the image. In the preferred embodiment, the two strokes should overlap by at least ½ inch to ensure that the entire image is captured and properly stitched together. Capture page module 78 detects the overlap and discards redundant image data when reconstructing a digital representation of the image. Once the entire image has been traversed, the user releases capture button 54 as shown in FIG. 10D to end the image capture procedure. While the scanning procedure just described is the preferred technique, alternative paths can be taken along the target image as long as the entire image is covered and appliance 22 remains in engagement with the target. Nevertheless, wandering paths that result in numerous sections of overlap or require extensive backtracking with appliance 22 to traverse the entire image will necessitate more extensive processing in filtering out redundant image data as capture page module 78 reconstructs the captured image.

Figure 11A:
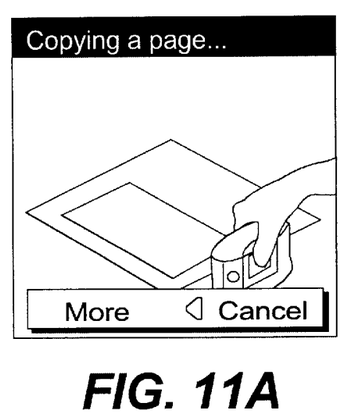
FIGS. 11A–11B depicts an improper scan path using the appliance of FIGS. 1A–1D.
Figure 11B:
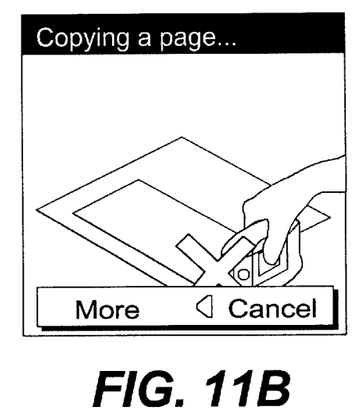
Figure 12A:
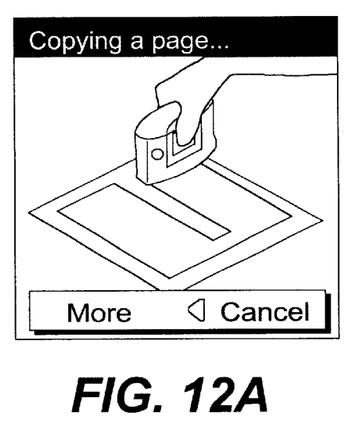
FIGS. 12A–12B depicts another improper scan path using the appliance of FIGS. 1A–1D.
Figure 12B:
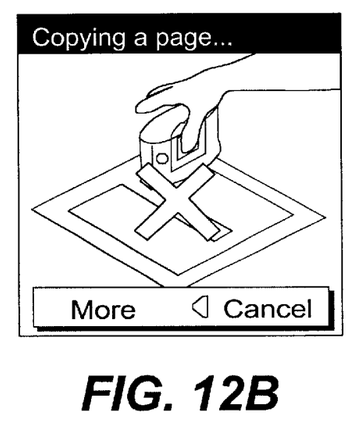

FIGS. 11A–11B and 12A–12B illustrate two common mistakes made by the user in scanning a new image. In FIG. 11A, the user is shown to leave the target image with appliance 22 thus acquiring unwanted image data. The error is highlighted in FIG. 1B with the X over the errant scan region. FIG. 12A illustrates a scan path that is very close to the preferred scan path shown in FIGS. 10A–10D. Notice, however, that in FIG. 12A the user failed to overlap the second stroke or pass made along the right side of the image with the initial stroke or pass made over the left side of the image. As a result, the center portion of the image is not acquired as indicated by the X in FIG. 12B.

Figure 9A:
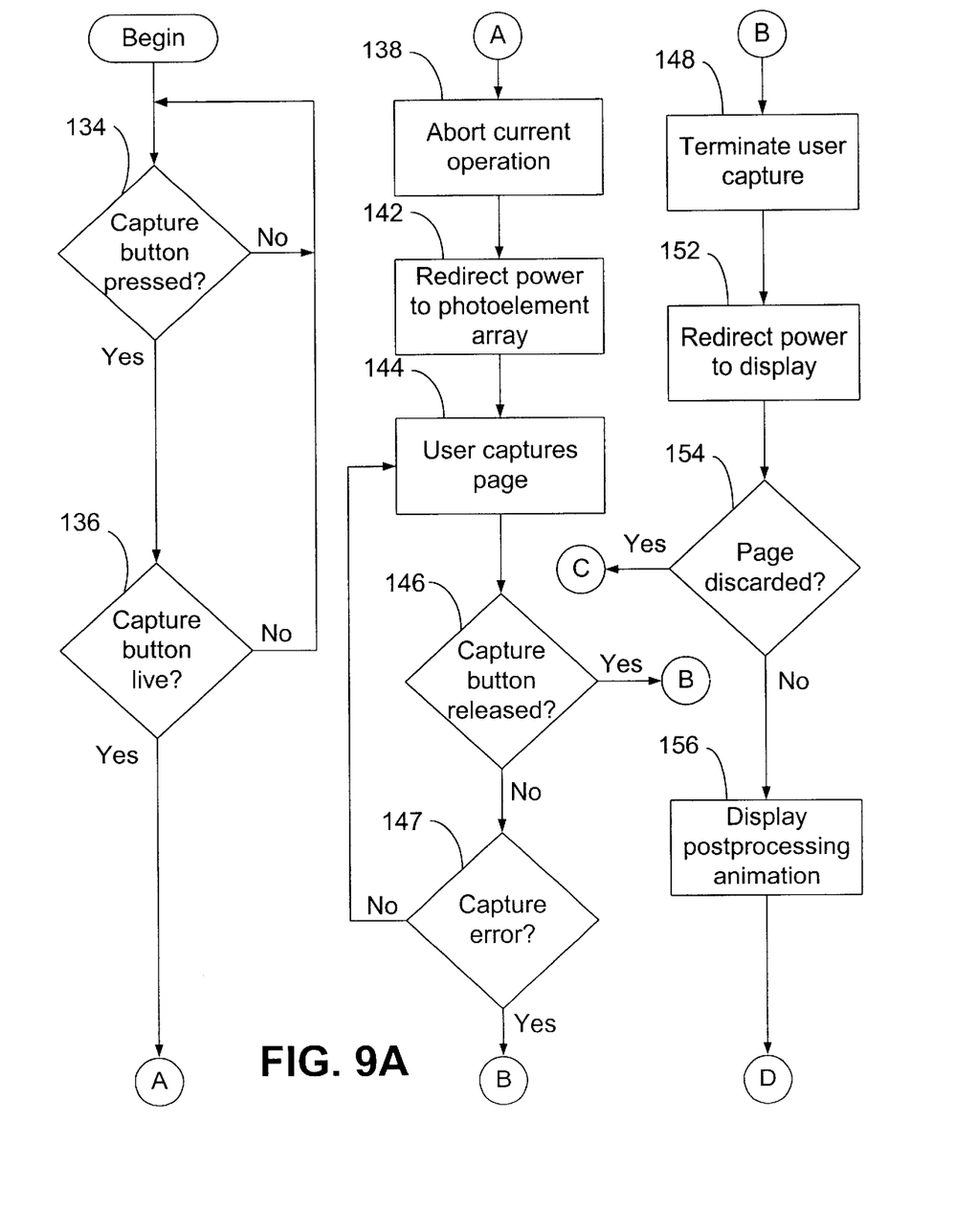
FIGS. 9A and 9B are a flow chart describing the page or image capture process using the appliance of FIGS. 1A–1D and controlled by the capture page module of FIG. 2.
Figure 13:
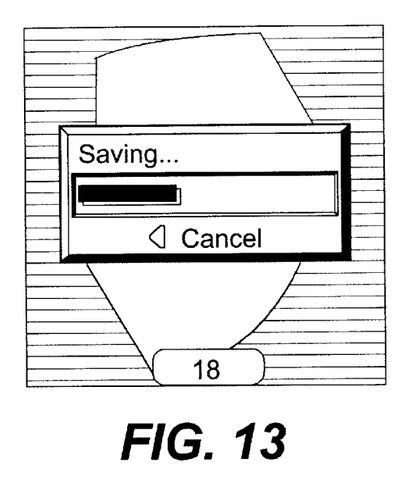
FIG. 13 illustrates a post-processing screen following an image or page scan displayed on the display screen of FIG. 1A.

Returning to the flow chart of FIG. 9A, once the user releases capture button 52, disengages appliance 22 from the target, or encounters any other capture error, the capture is terminated in step 148 and power is redirected to display 24 in step 152. During this post capture period, capture page module 78 processes the acquired image by discarding redundant image data due to overlap during scanning and adds control data to save the new page in sequence with previously acquired pages. While this processing is taking place, however, the user can choose to discard the newly acquired image. As shown in FIG. 13, a post-processing animation is shown on display 24 that represents the processing carried out under the control of capture page module 78 during the post capture period. A horizontal bar graph is used to communicate the progress of the new page processing. Inasmuch as the task of processing the newly acquired image data requires a finite amount of processing time, the animated bar graph can be correlated to track this processing interval with a suitable degree of precision. Accordingly, once the bar substantially fills the block in which it is contained, post capture processing is complete. It will be appreciated that alternative progress icons can be used, such as an hour glass or a digital percentage readout, without departing from the spirit of the present invention. The bar graph block further notifies the user that post capture processing can be canceled and the newly acquired image discarded through invocation of navigation button 46. This option is represented in the flow chart of FIG. 9A as decision diamond 154. Thus, throughout the time that the post-processing animation is on display in step 156, the user can choose to end the processing and discard the image by simply pressing navigation button 46, which results in display 24 returning to the previous view (i.e., the content of display 24 prior to initiation of an image capture) in step 158 by following termination C in FIG. 9B. To assist the user in making this decision, the bar graph is superimposed over a portion of a highlight or outline (i.e., no image content is displayed) of the scan path (see FIG. 13), providing an early indication that portions of the desired image could be missing and the captured page should be discarded.

Figure 9B:
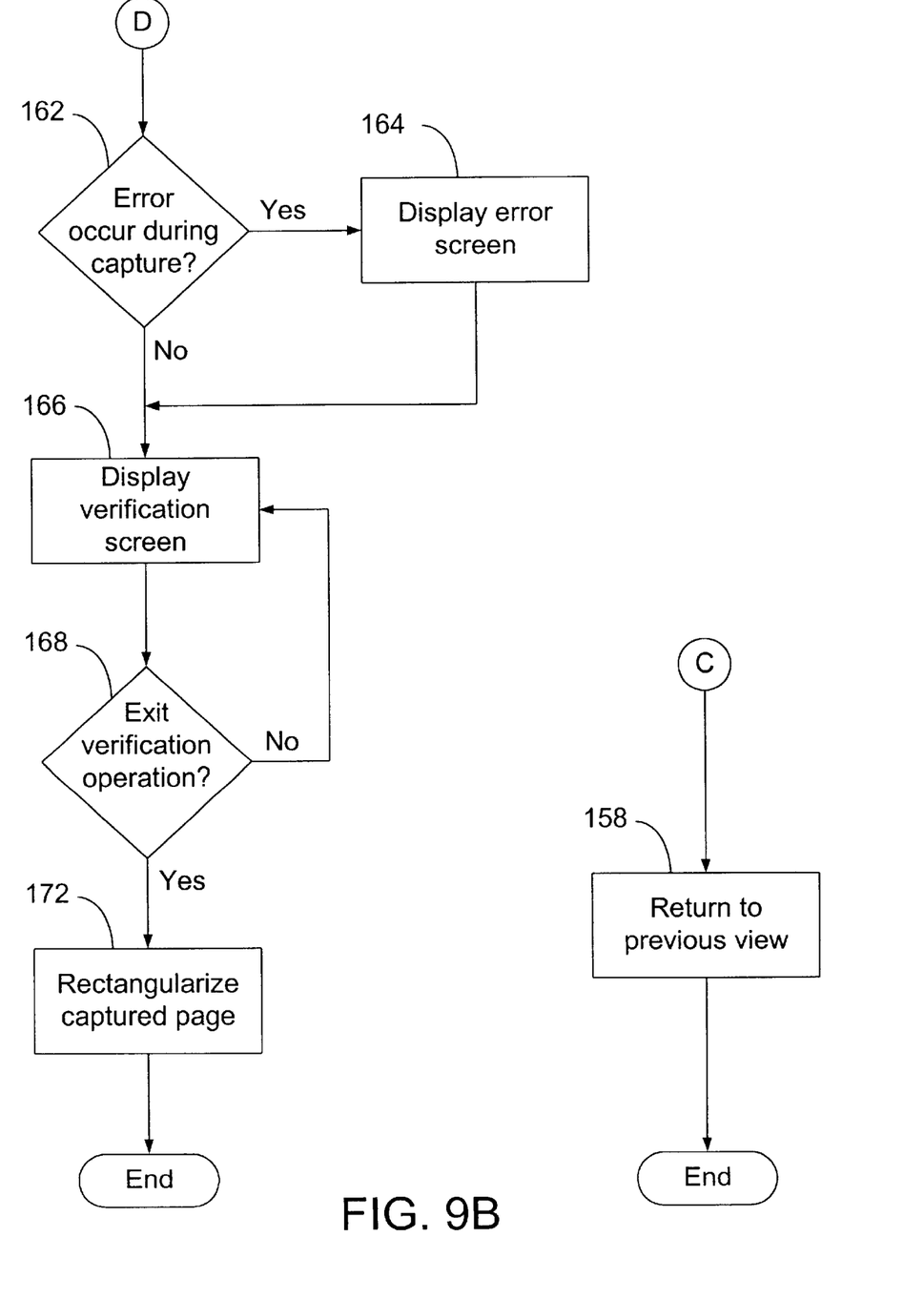
Figure 14:
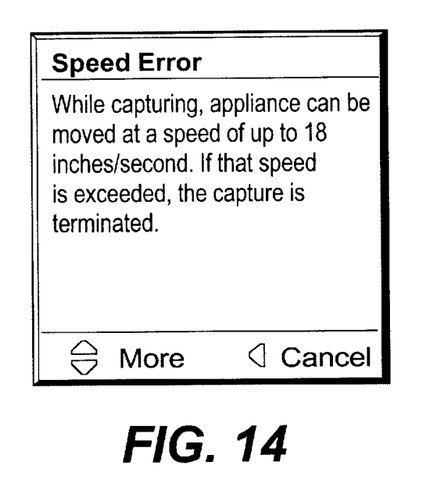
FIG. 14 illustrates a scan error screen displayed on the display screen of FIG. 1A.

If the captured image is not discarded, post capture processing will complete and the process will continue at termination D of FIG. 9B. At decision diamond 162, capture page module 78 determines whether an error occurred during the scan and, if so, transfers control to error utility module 98 where an error screen such as the example shown in FIG. 14 is displayed on display 24 in step 164. Examples of errors identified in the preferred embodiment of the present invention include the following: a) appliance 22 cannot navigate across the target medium; b) the user lifted appliance 22 from the scan target while capture button 52 was depressed; c) the maximum scan speed was exceeded; d) the maximum capture size was exceeded; and e) memory 64 is full.

Figure 15:
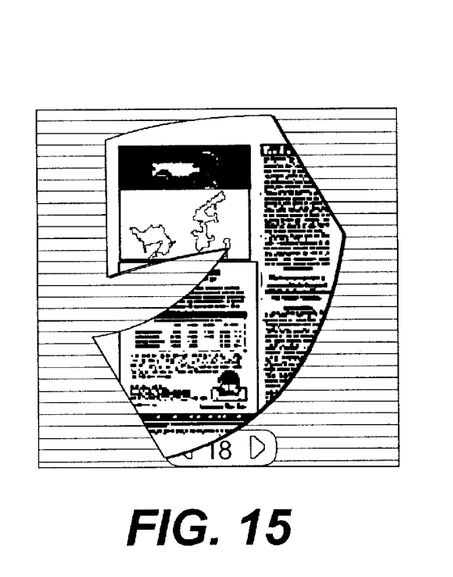
FIG. 15 illustrates a verification screen for a captured image or page displayed on the display screen of FIG. 1A.
Figure 16:
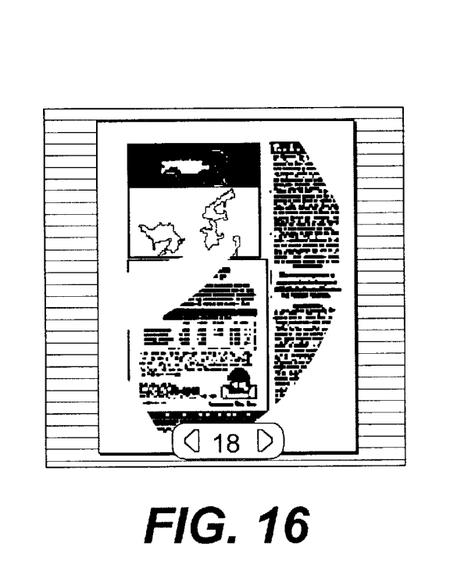
FIG. 16 illustrates a rectangularized version of a captured page displayed on the display screen of FIG. 1A.

Capture page module 78 then displays a verification screen as shown in FIG. 15 in step 166 even if an error occurred because the verification may help a user understand the consequence of the error. Furthermore, the captured page may nevertheless be satisfactory for the user's purpose in spite of the error. The verification screen provides a fully processed view of the captured image that illustrates the path followed by the user in performing the image capture. The verification screen therefore allows the user to examine their scan results in detail for such errors as an incorrect capture path or missing content to determine whether the page should be kept or discarded. To reinforce the logical relationship between the captured images, a thumbnail view of the last page captured is briefly displayed on display 24 with the newly captured page shown to slide onto the display from the right thereby displacing the last page captured to the left. This animation conveys to the user that the verification screen of the newly captured image represents a new last page in the sequence of captured pages. The page shown in FIG. 15 is an example of a poor scan technique as portions of the image are clearly missing. As represented by decision diamond 168, some operations attempted by the user while the verification screen is on display results in the page transforming through an animation into a rectangularized page as shown in FIG. 16 in step 172. This includes such operations as a power cycle, an automatic shutdown, viewing another page, attaching to a previous page, capturing another page, or sending a page or group of pages to an external appliance or device. The verification screen will remain on display if other operations such as accessing a menu through any of buttons 26, 34, 36, and 38 (see FIG.

1A) or a zoom or rotation operation is attempted through buttons 28 and 32 respectively. The rectangularization process places a border around the verification image to portray the image as it would be embodied in a printed page. Thus, for example, if the user decides after reviewing the verification screen that the newly captured image should be discarded, control will be passed to delete page module 92 upon activation of delete button 34 where the newly captured page can be deleted following the same process used to delete any captured page.

Application software 70, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The principles of the present invention have been disclosed herein as embodied in a portable, hand-held image capture and communication appliance that provides the flexibility of traditional hand-held scanners yet offers an array of intelligent features not heretofore known in the art. For example, images or pages can be acquired using the capture and communication appliance using a simple and easy to learn scan technique that can be executed using a single hand. Moreover, the appliance is capable of discarding redundant image data from overlapping paths taken during image capture thereby allowing the user to focus on traversing the entire target image. Once the image capturing process is complete, animation is used during post capture processing to communicate to the user the results of the capture, including whether an errant capture path was followed and/or image content was missed during the capture. If an error occurs, an error screen is displayed to explain the nature of the problem to the user, however, the image is still displayed in case the user has sufficient information captured.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A hand-held image capture and communication appliance, comprising:
   a photoelement array for acquiring a plurality of image data portions;
   a memory for saving said plurality of image data portions;
   a processor in communication with said memory; and
   program code stored in said memory and executed by said processor, said program code at least a capture page module comprising at least having:
   a first code segment configured to identify, filter and discard redundant image data associated with each one of said plurality of image data portions acquired through said photoelement array, such that said plurality of image data portions are reconstructed into a single image data corresponding to a captured image; and
   a second code segment for determining an error condition such that said first code segment fails to reconstruct said plurality of image data portions into said single image data corresponding to said captured image.

2. The appliance of claim 1, wherein said program code further comprises an error utility module for displaying a textual dialog on a display in response to an error incurred while acquiring said image data.

3. The appliance of claim 1, wherein said second code segment further includes terminating the acquiring of said plurality of image data portions when said error condition is identified.

4. The appliance of claim 3, wherein said error condition corresponds to said appliance unable to navigate across a medium associated with said captured image.

5. The appliance of claim 3, wherein said second code segment further includes displaying of said plurality of image data portions when said error condition is identified.

6. The appliance of claim 3, wherein said error condition corresponds to a user moving said appliance out of contact from said scanned image.

7. The appliance of claim 3, wherein said error condition corresponds to moving said appliance across said captured image at a speed greater than a predefined scan speed.

8. The appliance of claim 3, wherein said error condition corresponds to said captured image exceeding a maximum capture size.

9. The appliance of claim 3, wherein said error condition corresponds to said memory becoming fully utilized.

10. A method of capturing an image using a hand-held image capture and communication appliance having a display for exhibiting the image, comprising the steps of:
    capturing a first image data portion corresponding to a first portion of said image with the communication appliance;
    capturing a second image data portion corresponding to a second portion of said image with the communication appliance;
    discarding redundant image data associated with said first image data portion and said second image data portion acquired through said capturing steps;
    combining said first and second image data portions such that said plurality of image data portions are reconstructed into a single image data corresponding to said first and second image data portions;
    determining a scanning error condition such that said step of combining fails so that said single image data corresponding to said single image data cannot be reconstructed; and terminating the acquiring of said plurality of image data portions in response to the step of determining said scanning error condition.

11. The method of claim 10, further comprising the step of:

displaying a textual dialog on a display in response to an error incurred during said capturing steps.

12. The method of claim 10, wherein said step of determining the scanning error condition further comprises determining when said appliance is unable to navigate across a medium associated with said image.

13. The method of claim 10, wherein said step of determining the scanning error condition further comprises determining when said communication appliance is moved out of contact from a medium associated with said image.

14. The method of claim 10, wherein said step of determining the scanning error condition further comprises determining when said communication appliance is moved over a medium associated with said image exceeding a predefined scan speed.

15. The method of claim 10, wherein said step of determining the scanning error condition further comprises determining when said communication appliance is moved over an image exceeding a maximum image capture size.

16. The method of claim 10, wherein said step of determining the scanning error condition further comprises determining when a memory residing in said communication appliance becomes fully utilized.

* * * * *